(12) United States Patent
Torabi

(10) Patent No.: US 8,902,046 B2
(45) Date of Patent: Dec. 2, 2014

(54) RFID READING TUNNEL AND METHOD FOR READING RFID TRANSPONDERS

(75) Inventor: Bahram Torabi, Freiburg (DE)

(73) Assignee: Sick AG, Waldkirch (DE)

( * ) Notice: Subject to any disclaimer, the term of this patent is extended or adjusted under 35 U.S.C. 154(b) by 237 days.

(21) Appl. No.: 13/400,456

(22) Filed: Feb. 20, 2012

(65) Prior Publication Data

US 2012/0212327 A1    Aug. 23, 2012

(30) Foreign Application Priority Data

Feb. 21, 2011   (DE) .......................... 10 2011 000 852

(51) Int. Cl.
*H04Q 5/22*      (2006.01)
*G06K 7/10*      (2006.01)

(52) U.S. Cl.
CPC ........ G06K 7/10445 (2013.01); G06K 7/10099 (2013.01)
USPC ...................................................... 340/10.1

(58) Field of Classification Search
USPC .................. 340/10.1, 572.1, 572.3, 505, 12.5
See application file for complete search history.

(56) References Cited

U.S. PATENT DOCUMENTS

| | | | |
|---|---|---|---|
| 5,793,305 A | 8/1998 | Turner et al. | |
| 6,104,291 A | 8/2000 | Beauvillier et al. | |
| 7,468,650 B2 * | 12/2008 | Childress et al. | 340/5.92 |
| 7,468,670 B2 * | 12/2008 | Liu et al. | 340/572.1 |
| 8,056,817 B2 * | 11/2011 | Flood | 235/492 |
| 8,395,482 B2 * | 3/2013 | Sadr et al. | 340/10.3 |
| 2006/0125640 A1 | 6/2006 | Oakes et al. | |
| 2006/0244607 A1 * | 11/2006 | Liu et al. | 340/572.7 |
| 2007/0030150 A1 | 2/2007 | Mullins | |
| 2008/0185540 A1 | 8/2008 | Turner et al. | |

FOREIGN PATENT DOCUMENTS

| | | |
|---|---|---|
| DE | 10 2005 036 088 A1 | 2/2007 |
| EP | 1 047 011 A2 | 10/2000 |
| WO | 2005/104023 A1 | 11/2005 |
| WO | 2008/092803 A1 | 8/2008 |

OTHER PUBLICATIONS

German Examination Report issued in counterpart German Patent Application 10 2011 000 852.7; (2011).
European Search Report issued on May 4, 2012.

* cited by examiner

*Primary Examiner* — Vernal Brown
(74) *Attorney, Agent, or Firm* — Nath, Goldberg & Meyer; Jerald L. Meyer; Leonid D. Thenor

(57) ABSTRACT

RFID reading tunnel (10) comprising at least one RFID reading apparatus (12) installed at a reading zone (20) of a conveyor (14) or of a passageway for reading RFID transponders (24) in the reading zone (20) is provided, wherein the RFID reading apparatus (10) has a reading reception antenna (26) attached to the reading zone (20) for receiving RFID signals from the reading zone (20) and an evaluation unit (32) for reading RFID information from the RFID signals. In this respect, an additional reception antenna (28) which is attached so that RFID signals from the reading zone (20) cannot be received by the additional reception antenna (28) and the evaluation unit (32) is designed for a false reading check in which RFID information is discarded when the RFID signal belonging to the RFID information is received both by the reading reception antenna (26) and by the additional reception antenna (28).

12 Claims, 1 Drawing Sheet

RFID READING TUNNEL AND METHOD FOR READING RFID TRANSPONDERS

Figure 1:
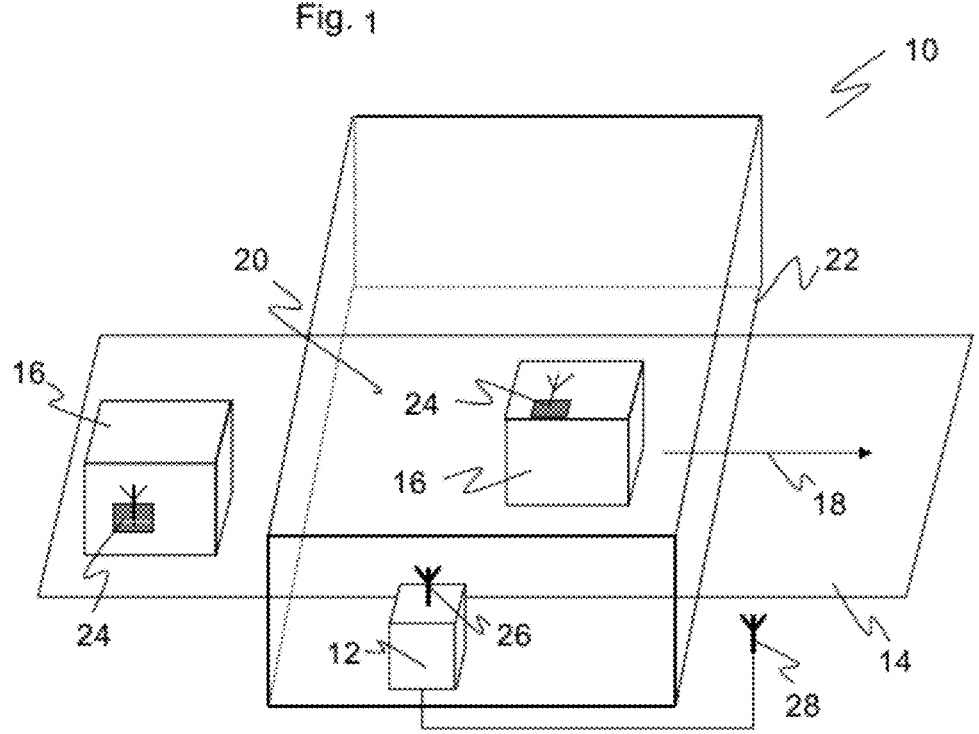

This is a Non-Provisional Application claiming the benefit under 35 U.S.C. §119 of German Patent Application No. 10 2011 000 852.7, filed on Feb. 21, 2011, the content of which is hereby incorporated by reference in its entirety.

The invention relates to an RFID reading tunnel having at least one RFID reading apparatus installed at a reading zone of a conveyor or of a passageway as well as to a method for reading RFID transponders.

RFID reading systems serve for the identification of objects and products and are used inter alia to automate logistical movements. RFID transponders fastened to the products are read out at an identification point, above all on a change of the owner of the product or on a change of the transport means, and information is optionally written back into the transponder. This results in fast and traceable logistical movements. The detected information is used to control the forwarding and sorting of goods and products. Important applications for automatic identification are logistical distribution centers, for instance of package shippers, or the baggage check-in at airports.

A frequent deployment site of an RFID reading system is the installation at a conveyor belt on which the goods are conveyed or in a so-called reading portal. Any desired passageway is to be understood by this which is equipped with one or more RFID readers and possibly with further sensors. Objects are moved through the reading portal by means of a conveyor belt, by means of a transport vehicle such as a forklift, or also manually and are in so doing identified with reference to their RFID transponder.

RFID transponders can basically be active, that is have their own energy supply and generate electromagnetic radiation independently. In practice, however, these transponders are less suitable for logistics because the unit prices for such transponders cannot reach the low level required for the mass market due to the energy supply. Passive transponders without their own energy supply are therefore usually used. In both cases, the transponder is excited to radiate the stored information by electromagnetic radiation of the reading device, with passive transponders taking the required energy from the transmission energy of the reading system. In the established ultra high frequency standard ISO 18000-6, passive transponders are read out using the backscatter process.

The reading range of an RFID system, particularly in the ultrahigh frequency range, is very high at ten meters and more. Transponders are therefore also read out which are not even located in the designated reading zone. Metallic objects in the reading zone also amplify this undesired effect because they result in reflections and thus multipath propagation. Even transponders behind the antenna can be read in this manner.

The RFID system, however, initially has no possibility to localize the source of the information successfully read out of the transponder. The read-out information can thereby not be reliably associated with the object in the reading zone. A spatially selective reading is, however, aimed for in practical use. On a conveyor belt, for example, only transponders of objects should be evaluated which are also actually moved on the conveyor belt and at a reading portal only those which pass through the reading portal.

An approach to ensure the correct association of information read from a transponder with an object in the reading zone comprises determining the direction from which the RFID signal was received. Sign strength processes (RSSI) and phase processes are used for this purpose. Both, however, result in a substantial increased effort and in a complicated evaluation which is not reliable under all conditions.

Furthermore, an attempt is conventionally made to restrict the transmitted signal of the RFID reader by shielding measures so that RFID transponders not disposed in the reading zone are not addressed from the outset. Conversely, the shield should prevent the response of RFID transponders outside the reading field from reaching the reception antenna. Such a shield requires a very large effort and there are nevertheless cases in which the shielding measures are not effective. One major cause for this are reflections, above all at the objects in the reading zone themselves, which divert the transmitted signal into the outer zone of the shield or which divert the received signal from there to the reception antenna.

It is therefore the object of the invention to reduce the number of false readings from transponders outside the reading zone.

This object is satisfied by an RFID reading tunnel having at least one RFID reading apparatus installed at a reading zone of a conveyor or of a passageway for reading RFID transponders in the reading zone, wherein the RFID reading apparatus has a reading reception antenna attached to the reading zone for receiving RFID signals from the reading zone and an evaluation unit for reading out RFID information from the RFID signals, wherein an additional reception antenna which is attached so that RFID signals from the reading zone cannot be received by the additional reception antenna, with the evaluation unit being designed for a false reading check in which RFID information is discarded when the RFID signal belonging to the RFID information is received both by the reading reception antenna and by the additional reception antenna.

In a further aspect the invention relates to method for reading RFID transponders in a reading zone of an RFID reading tunnel at a conveyor or at a passageway, wherein RFID signals from the reading zone are received by a reading reception antenna attached to the reading zone and RFID information is read out of the RFID signals, wherein RFID information is discarded in a false reading check when the RFID signal belonging to the RFID information is received both by the reading reception antenna and by at least one additional reception antenna which is attached so that RFID signals from the reading zone cannot be received by the additional reception antenna.

In this respect, the invention starts from the basic principle of using an additional reception antenna which listens directly for RFID signals outside the reading tunnel. This additional reception antenna is accordingly attached so that RFID signals from the reading zone are not received where possible. In practical use, it will not be able to be fully precluded that RFID signals from the reading zone also reach the additional reception antenna after multiple reflections. It is, however, by all means possible substantially to reduce the probability of such events, and indeed even more than conversely to reduce the probability that an RFID signal from outside the reading tunnel reaches the actual reading reception antenna. For this purpose, the additional reception antenna is, for example, attached and aligned at a sufficiently large distance, without a direct line of sight to the reading zone and/or behind one or more obstacles non-permeable for electromagnetic radiation. Provision can additionally be made that the additional reception antenna easily receives RFID signals from zones from which a false reading by the reading reception antenna is expected, that is, for example, the entry and exit zones of the RFID reading tunnel or further RFID reading stations in the proximity of the separate RFID reading tunnel.

A false reading check is then carried out with the aid of the received signal of the additional reception antenna. If both the reading reception antenna and the additional reception antenna have received an RFID signal, the associated transponder cannot be in the reading zone because the additional reception antenna does not receive any signals from there. Such RFID information is therefore considered a false reading and is discarded.

The invention has the advantage that the number of false readings is reduced. As described above, this is not a case of false readings in which a transponder could not be read ("negative false read"), but, in contrast, a successful reading which, however, delivers information of a transponder which is not located in the reading zone and which should therefore not have been read at all, or at least not at this point in time ("positive false read"). The reliability of the RFID tunnel is thereby increased. An even higher degree of automation is achieved and manual post processing or even incorrect associations of RFID information to objects are prevented.

The evaluation unit is preferably designed to read out RFID information both from RFID signals received with the reading reception antenna and RFID signals received with the additional reception antenna and to compare the RFID information of the reading reception antenna and of the additional reception antenna with one another on the false reading check. The false reading check thus takes place at the level of the already decoded RFID information. If one and the same transponder were able to be read out successfully both via the reading reception antenna and via the additional reception antenna, a conclusion is drawn on a position of the associated transponders outside the reading zone and the RFID information is discarded.

The evaluation unit is preferably designed to compare the RFID signals of the reading reception antenna and of the additional reception antenna with one another on the false reading check. The false reading check therefore takes place here at a level of the electromagnetic RFID signals very close to the hardware. This can assist or replace a comparison at the level of the RFID information. The RFID signals will, as a rule, not be directly comparable, but must be preprocessed, possibly also partly decoded.

The RFID reading tunnel preferably has a transmission antenna attached to the reading zone to transmit a carrier signal into the reading zone, which transponder provides the energy for radiating the RFID signals in the reading zone. Passive transponders can thus be read out. The transmission antenna only reaches the reading zone where possible. This cannot be completely ensured; otherwise, the problem of false readings solved by the additional reception antenna would not occur in the first place. Even more preferably, the transmission antenna and the reading reception antenna are the same antenna. One component can thus be saved. The RFID reading apparatus is preferably a UHF RFID reading apparatus, with a reading apparatus always also being able to mean a read/write apparatus.

The RFID reading tunnel preferably has a shield, with the reading zone and the reading reception antenna being arranged within the shield and the additional reception antenna being arranged outside the shield. The shield is intended to achieve that the carrier signal of the transmission antenna is selectively only received in the reading zone and conversely only RFID signals from transponders inside the reading zone reach the reading reception antenna. The shield can, however, not perform this without error, simply due to the openings through which objects with transponders move into the reading zone and out of the reading zone. Due to the additional reception antenna used in accordance with the invention, the shield can, on the other hand, have a much less complex design and can even be fully omitted in borderline cases.

The shield preferably surrounds the reading zone except for openings for the conveyor and objects located on the conveyor or expect for the passageway itself. The reading zone is thus shielded as best as possible to assist the false reading check.

The additional reception antenna is preferably attached to an outer side of the shield remote from the reading zone. The outer side of the shield provides positions and arrangements for the additional reception antenna with which it can very reliably be ensured that RFID signals of the reading zone do not reach the additional reception antenna. RFID signals from transponders outside the reading zone which could cause a false reading after reflections via the reading reception antenna thereby become easily receivable with an often direct line of sight.

At least one further additional reception antenna is advantageously provided, with the evaluation unit being designed to discard RFID information in the false reading check if the RFID signal belonging to the RFID information is received both by the reading reception antenna and by at least one of the additional reception antennas. Even more potential sources of false readings can be recognized by such further additional reception antennas to further increase the reading rate of the RFID tunnel. The properties of the further additional reception antennas with respect to the design, arrangement, evaluation and the like are analog to the additional reception antenna when there is only one such additional reception antenna.

The method in accordance with the invention can be further developed in a similar manner and shows similar advantages in so doing. Such advantageous features are described in an exemplary, but not exclusive manner in the subordinate claims dependent on the independent claims.

Figure 2:
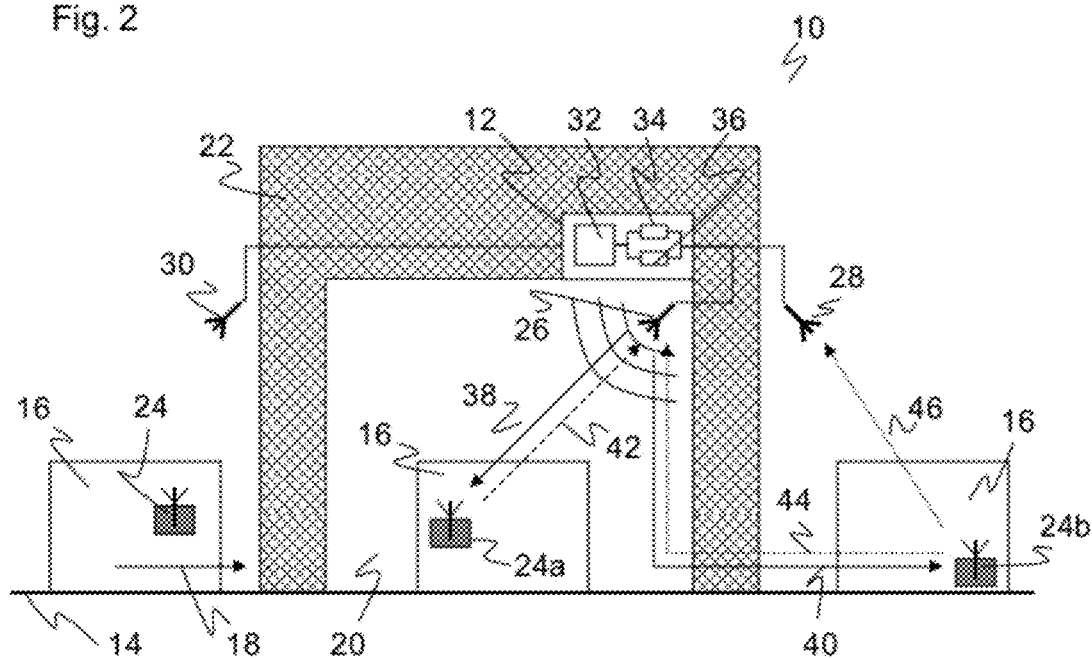

The invention will be explained in more detail in the following also with respect to further features and advantages by way of example with reference to embodiments and to the enclosed drawing. The Figures of the drawing show in:

FIG. 1 a schematic three-dimensional overview representation of an RFID reading tunnel in accordance with the invention at a conveyor belt; and FIG. 2 a schematic sectional representation of a further embodiment of an RFID reading tunnel in accordance with the invention.

FIG. 1 shows an overview representation of an RFID tunnel 10 in accordance with the invention. An RFID reader 12 is installed at a conveyor 14 which conveys objects 16 through a reading zone 20 in a direction indicated by an arrow 18. An electromagnetic shield 22, only shown schematically, is provided above the reading zone 20.

RFID transponders 24 are arranged at the objects 16 and are read out by the RFID reader 12 when they are located in the reading zone 20. The RFID reader 12 has a reading reception antenna 26 for receiving RFID signals for this purpose. The antenna 26 can additionally be used as a transmission antenna for writing processes to an RFID transponder 24 and for the supply of RFID transponders 24 with a carrier signal. Alternatively, a separate transmission antenna, not shown, is provided for this purpose. The structure of an RFID reader 12 and of a transponder 24 as well as their communication between one another are known per se to the skilled person.

An additional reception antenna 28 which is connected to the RFID reader 12 is located outside the reading zone 20. The additional reception antenna 28 is arranged and aligned such that it only receives signals from transponders 24 outside the reading tunnel 10 and thus does not receive any RFID signals from the reading zone 20. The additional reception antenna 28 thus listens to RFID transponders 24 which are not located in the reading zone 20.

Differing from the representation, the reading tunnel 10 thus created can include further RFID readers or antennas to detect RFID signals from the reading zone 20 at further positions and from further directions. Equally, other sensors are possibly provided to acquire additional information on the objects 14, for example their entry into the reading zone 20 and exit from the reading zone 20 or the volume or weight of the objects 16. Finally, the invention also includes reading portals at which no automatic conveyor 14 is provided, but rather in which vehicles or persons which/who can carry the objects 16 with them move through a reading tunnel designed as a reading portal.

The RFID reader 12 uses the signal of the additional reception antenna 28 to recognize false readings of RFID transponders 24 which are not located in the reading zone 20 during the reading. This will be described with reference to FIG. 2 which shows an RFID reading tunnel 10 in section and which only differs from the embodiment in accordance with FIG. 1 in that a further additional reception antenna 30 is provided and it shows some internal elements of the RFID reader 12.

As FIG. 2 shows, the RFID reader 12 has an evaluation unit 32 which simultaneously represents the control of the RFID reader 12. Alternatively or additionally, a control, not shown, which takes over or assists this control and evaluation work, can be provided outside the RFID reader 12. A transmission driver circuit 34 and a reception circuit 36 are connected both to the evaluation unit 32 and to the antennas 26, 28, 30 to transmit or receive electromagnetic RFID signals. In this respect, the additional antennas 28, 30 are preferably pure reception antennas, whereas the reading reception antenna 26 additionally transmits a carrier signal and an RFID signal.

Propagation paths of the carrier signal are indicated by solid arrows 38, 40. In this respect, the direct propagation path 38 from the antenna 26 to a transponder 24a in the reading zone 20 is desired, whereas the indirect propagation path 40 arises due to reflection and thus also reaches transponders 24b outside the reading zone 20.

Not only the desired RFID signal shown by a dashed arrow 42 of the transponder 24a within the reading zone 20 therefore reaches the reading reception antenna 26. An RFID signal shown by a dotted arrow 44 from a transponder 24b outside the reading zone 20 also unintentionally reaches the reading reception antenna 26 due to reflections. The RFID reader 12 therefore decodes the RFID information both of the transponder 24a within the reading zone and of the transponder 24b outside the reading zone and first has no possibility to recognize which of these two pieces of RFID information is relevant.

The RFID signal shown by a dotted arrow 46 of the transponder 24b, however, also reaches the additional reception antenna 28. The evaluation unit 32 can therefore distinguish the transponder 24a within the reading zone 20 and the transponder 24a outside the reading zone 20 by a comparison of the received signals inside and outside the reading tunnel 10.

A false reading check thus becomes possible in the evaluation unit 32 due to the additional listening reception antenna 28 outside the reading zone 20. Transponders 24b which can be read both from the inside and from the outside are in this respect recognized as "false positive reads" and their RFID information is discarded. The rate of correct RFID readings of the reading tunnel 10 and the correct association between the RFID information and objects 16 can thus be substantially improved.

As shown in FIG. 2, further additional reception antennas 30 can be provided to cover further zones from which false readings from transponders 24 are possible. In this respect, as shown, the input zone and output zone of the RFID tunnel 10 can be checked. Equally, however, the conveying direction 18 in FIG. 2 could also be rotated by 90° so that objects 16 can therefore be conveyed into the plane of the paper. The additional reception antennas 28, 30 then listen to the side zones of the RFID reading tunnel where further RFID reading paths are located, for example. This example illustrates that the number and arrangement of additional reception antennas 28, 30 can be advantageously varied.

The invention claimed is:

1. An RFID reading tunnel (10) comprising at least one RFID reading apparatus (12) installed at a reading zone (20) of a conveyor (14) or of a passageway for reading RFID transponders (24) in the reading zone (20), wherein the RFID reading apparatus (10) has a reading reception antenna (26) attached to the reading zone (20) for receiving RFID signals from the reading zone (20) and an evaluation unit (32) for reading out RFID information from the RFID signals, wherein the reading tunnel comprises an additional reception antenna (28) which is attached so that RFID signals from the reading zone (20) cannot be received by the additional reception antenna (28), with the evaluation unit (32) being designed for a false reading check in which RFID information is discarded when the RFID signal belonging to the RFID information is received both by the reading reception antenna (26) and by the additional reception antenna (28).

2. An RFID reading tunnel (10) in accordance with claim 1, wherein the evaluation unit (32) is designed to read out RFID information both from RFID signals received by the reading reception antenna (26) and RFID signals received by the additional reception antenna (28) and to compare the RFID information of the reading reception antenna (26) and of the additional reception antenna (28) with one another on the false reading check.

3. An RFID reading tunnel (10) in accordance with claim 1, wherein the evaluation unit (32) is designed to compare the RFID signals of the reading reception antenna (26) and of the additional reception antenna (28) with one another on the false reading check.

4. An RFID reading tunnel (10) in accordance with claim 1, which has a transmission antenna (26) attached to the reading zone (20) to transmit a carrier signal into the reading zone (20) which supplies transponders (24) in the reading zone (20) with the energy for radiating the RFID signals.

5. An RFID reading tunnel (10) in accordance with claim 4, wherein the transmission antenna and the reading reception antenna are the same antenna (26).

6. An RFID reading tunnel (10) in accordance with claim 1, which has a shield (22), with the reading zone (20) and the reading reception antenna (26) being arranged within the shield (22) and the additional reception antenna (28) being arranged outside the shield (22).

7. An RFID reading tunnel (10) in accordance with claim 6, wherein the shield (22) surrounds the reading zone (20) with the exception of openings for the conveyor (14) and objects (16) located on the conveyor (14) or except for the passageway.

8. An RFID reading tunnel (10) in accordance with claim 6, wherein the additional reading antenna (28) is attached to an outer side of the shield (22) remote from the reading zone (20).

9. An RFID reading tunnel (10) in accordance with claim 1, wherein at least one further additional reception antenna (30) is provided, and wherein the evaluation unit (32) is designed to discard RFID information in the false reading check if the RFID signal belonging to the RFID information is received both by the reading reception antenna (26) and by at least one of the additional reception antennas (28, 30).

10. A method for reading RFID transponders (24) in a reading zone (20) of an RFID reading tunnel (10) at a conveyor (14) or at a passageway, wherein RFID signals from the reading zone (20) are received by a reading reception antenna (26) attached to the reading zone (20) and RFID information is read out of the RFID signals, wherein RFID information is discarded in a false reading check when the RFID signal belonging to the RFID information is received both by the reading reception antenna (26) and by at least one additional reception antenna (28, 30) which is attached so that RFID signals from the reading zone (20) cannot be received by the additional reception antenna (28, 30).

11. A method in accordance with claim 10, wherein the reading reception antenna (26) is arranged within a shield (22) and the at least one additional reception antenna (28, 30) is arranged outside the shield (22).

12. A method in accordance with claim 11, wherein the at least one additional reception antenna (28, 30) is attached to an outer side of the shield (22) remote from the reading zone (20).

* * * * *